(12) United States Patent
Izuta et al.

(10) Patent No.: US 7,964,108 B2
(45) Date of Patent: Jun. 21, 2011

(54) REGENERATION METHOD OF ETCHING SOLUTION, AN ETCHING METHOD AND AN ETCHING SYSTEM

(75) Inventors: Nobuhiko Izuta, Okayama (JP); Haruru Watatsu, Okayama (JP)

(73) Assignee: Apprecia Technology Inc., Tokyo (JP)

( * ) Notice: Subject to any disclaimer, the term of this patent is extended or adjusted under 35 U.S.C. 154(b) by 745 days.

(21) Appl. No.: 11/907,214

(22) Filed: Oct. 10, 2007

(65) Prior Publication Data

US 2008/0087645 A1    Apr. 17, 2008

(30) Foreign Application Priority Data

Oct. 12, 2006   (JP) ................................ 2006-279098

(51) Int. Cl.
  *C03C 25/68*  (2006.01)
  *B01D 37/00*  (2006.01)
(52) U.S. Cl. ........................................ 216/93; 210/806
(58) Field of Classification Search .................... 216/93; 210/767, 348; 156/345.18; 438/FOR. 116; 422/234

See application file for complete search history.

(56) References Cited

U.S. PATENT DOCUMENTS

| 2003/0168413 A1 | 9/2003 | Brett et al. ..................... 210/791 |
| 2004/0200806 A1* | 10/2004 | Izuta et al. ...................... 216/99 |
| 2005/0211378 A1* | 9/2005 | Iimori et al. ............. 156/345.18 |

FOREIGN PATENT DOCUMENTS

| DE | 197 40 327 A1 | 3/1999 |
| EP | 0 675 266 A1 | 10/1995 |
| JP | 3-20895 B2 | 3/1991 |
| JP | 6-310487 A | 11/1994 |
| JP | 9-219388 A | 8/1997 |
| JP | 2005-260179 A | 9/2005 |

* cited by examiner

*Primary Examiner* — Nadine G Norton
*Assistant Examiner* — Patti Lin
(74) *Attorney, Agent, or Firm* — Chapman and Cutler LLP (57) ABSTRACT

The present invention provides a regeneration process of the etching solution for the silicon nitride film, applying phosphoric acid aqueous solution, wherein multiple numbers of filters are connected to the piping path of etching solution extracted from the etching tank by switching alternately in parallel or in series; in both cases that said multiple numbers of filters are connected in parallel or in series, said extracted etching solution being supplied to a filter with a filter element of a high silicon removal rate of silicon compounds with already deposited silicon compounds, thus maintaining a high silicon removal rate of silicon compounds.

4 Claims, 7 Drawing Sheets

REGENERATION METHOD OF ETCHING SOLUTION, AN ETCHING METHOD AND AN ETCHING SYSTEM

BACKGROUND OF THE INVENTION

1. Field of the Invention

The present invention relates to a regenerating method of etching solution (phosphoric acid aqueous solution) used for etching a silicon nitride film, an etching method and an etching system, in particular, relating to a technology to eliminate always effectively silicon compounds (a reactive product of silicon nitride with phosphoric acid) contained in an etching solution by etching treatment.

2. Description of the Related Art

In the etching treatment for mass-production lines including those for various substrates, etching is continuously carried out while etching solution is being filter-circulated to remove foreign materials such as debris to keep the etching solution in the tank clean. Such operation is similarly applied to the etching treatment of a silicon nitride film by heated phosphoric acid aqueous solution (etching solution), wherein etching solution is subject to filter-circulation to eliminate silicon compounds crystallized in the etching solution, together with other foreign materials by filter-purification for continuous etching performance. (Refer to JP 3-20895 B (Patent Document 1))

Said method, however, involves a problem of decreased etching rates resulting from raised concentrations of silicon compounds in the etching solution as a consequence of repeated treatments with the same etching solution. In order to solve this problem, a removal method of silicon compounds in the etching solution is proposed, in which a filter with cooling function is used to cool down the filter to raise removal efficiency. (Refer to JP 9-219388 A (Patent Document 2))

As an alternative way, a method is proposed wherein purified water is supplied to a filter which filtrates the etching solution to remove deposited silicon compounds by means of dissolving. (Refer to JP 6-310487 A (Patent Document 3))

As a further alternatively proposed way, temperature distribution of phosphoric acid as etching solution is made non-uniform to raise removing efficiency by adding water just before the etching solution is filtrated. This method proposes an efficient use of filters for the etching solution by installing these filters in parallel, wherein one filter is used for rinsing purpose at the time of replacing phosphoric acid aqueous solution. (Refer to JP 2005-260179 A (Patent Document 4))

However, the methods or the systems for regenerating etching solution described in JP 3-20895 B (Patent Document 1), JP 9-219388 A (Patent Document 2) and JP 6-310487 A (Patent Document 3) need to remove silicon compounds deposited within the filter by way of water washing, etc., since silicon compounds which gradually deposit within the filter during operation cause filters to clog. For such removal, operation of the system must be stopped periodically, leading to extremely inefficient performance.

On the other hand, according to the method described in JP 2005-260179 A (Patent Document 4), the filters are arranged in parallel and if silicon compounds deposit and clog a filter in service, the clogged filter is switched by a valve to washing operation with water, and at the same time, the other filter is supplied with etching solution, without interrupting operation of the system.

However, it was found by the inventor's experiments that the removal amount of silicon compounds by the filter increased with the increase of silicon compounds deposited in the filter. Namely, it was found that the removal amount of silicon compounds by a new filter element with no deposited silicon compounds or a filter element with no deposited silicon compounds right after rinsing for removal of deposited silicon compounds was extremely small, and the removal amount of silicon compounds increases operating time of the filter up to even more than 10 times. However, if the filter continues to be operated beyond a certain time range, the filter clogged and became unserviceable.

Because of these reasons, in the regeneration process of the etching solution described in Patent Documents 1-4, the filters with a low removal rate have to be always used for a certain period of time from the operation start of a filter and from the resuming operation after washing. This need is same either with the case in which the system is shutdown for filter cleaning and or with the case in which the filter elements are arranged in parallel and operation is continued without interruption by switching.

SUMMARY OF THE INVENTION

Accordingly, the subject of the present invention is to eliminate weak points of said conventional methods and to provide a regenerating method of etching solution, an etching method and an etching system which can remove silicon compounds in the etching solution constantly at a high removal rate through use of filters with filter elements of a high silicon removal rate with already deposited silicon compounds beyond a certain amount level, having been used over a certain period of time, can eliminate silicon compounds produced in etching solution extremely efficiently, being more suitable for an industrial process, and can reduce the cost for regenerating treatment of etching solution.

In order to achieve said subject, the present invention is to provide a regenerating method of etching solution, wherein a silicon nitride film is etched with an etching solution comprising phosphoric acid aqueous solution within a treatment tank, the etching solution containing silicon compounds produced from said etching is extracted out of the treatment tank, said silicon compounds is removed from said extracted etching solution with a filter; characterized in that multiple filters are connected to the piping path for said extracted etching solution by switching alternately in parallel or in series, and said extracted etching solution is supplied at least to one of filters with an filter element of high silicon removal rate of silicon compounds with already deposited silicon compounds, except the case of initial parallel connection of said multiple filters at the start up operation, thus silicon compounds being removed with a high silicon removal rate of silicon compounds.

In one specific embodiment of the present invention, the invention is to provide a regenerating method of etching solution, wherein a silicon nitride film is etched with an etching solution comprising phosphoric acid aqueous solution in the treatment tank, the etching solution containing silicon compounds produced from said etching is extracted out of the treatment tank, said silicon compounds are removed from said extracted etching solution with a filter; characterized in that 1) multiple filters are connected to the piping path for said extracted etching solution, by switching alternately in parallel or in series,
2) in case that said multiple filters are connected in series, a filter right after rinsing for removal of deposited silicon compounds or the one with a filter element not in use, with no deposit of silicon compounds is installed upstream of said piping path and continues to run till silicon compounds deposit on the element of said filter up to the point at which silicon removal rate reaches high and at the same time, the other filter with a filter element of a high silicon removal rate with already deposited silicon compounds is installed downstream of said filter, to which said extracted etching solution is supplied in series to said multiple numbers of filters, in turn, 3) in case that said multiple filters are connected in parallel, said extracted etching solution is supplied to one filter of a high removal rate with already deposited silicon compounds and at the same time the other filter is removed for rinsing from the circulation line of said extracted etching solution;

except the first parallel connection of said multiple filters at the operation start up, said extracted etching solution is supplied to at least one filter of a high silicon removal rate of silicon compounds with already deposited silicon compounds, thus silicon compounds being removed with constantly high silicon removal rate of silicon compounds.

In another specific embodiment of the present invention, the invention is to provide a regeneration method of etching solution, wherein the time during which said multiple filters are used in series in the piping path is the time corresponding to one tenth to one half of the cumulative maximum at which clogging of the filter with silicon compounds occur.

In yet another specific embodiment of the present invention, the invention is to provide an etching method, wherein the etching method comprises an etching process of a silicon nitride film using an etching solution comprising phosphoric acid aqueous solution in a treatment tank, a circulation filtration process in which etching solution containing silicon compounds produced in said etching is extracted out of the treatment tank, filtrated and circulated to the treatment tank, and a phosphoric acid aqueous solution regeneration process in which a portion of etching solution is extracted out of said circulation filtration process, water is added to said partially extracted etching solution, and silicon compounds crystallized in said etching solution are filtered for removal, thus said etching solution being regenerated, characterized in comprising a regeneration process of etching solution described in said specific embodiments of the present invention and a process of returning said regenerated etching solution to said treatment tank of said etching process.

In a further specific embodiment of the present invention, the invention is to provide an etching system, wherein the etching system comprises the etching section comprising the treatment tank 1 to etch silicon nitride film using etching solution comprising phosphoric acid aqueous solution, the circulation filtration section in which etching solution containing silicon compounds produced during etching in said etching section is extracted out of said treatment tank, filtrated by filters and circulated to said treatment tank 1, and the phosphoric acid aqueous solution regeneration section in which a portion of said etching solution is extracted out of said circulation filtration section, and silicon compounds is eliminated, thus said etching solution being regenerated, characterized in having, in the piping path for the etching solution of said phosphoric acid aqueous solution regeneration section, multiple numbers of filters and valves to switch the piping path for said multiple numbers of filters alternately in parallel or in series, and maintaining high silicon removal rates of silicon compounds by switching said piping path for said etching solution, automatically in parallel or in series run during etching to supply said extracted etching solution to at least one filter with an filter element of a high silicon removal rate of silicon compounds with already deposited silicon compounds, except the case of the first parallel connection of said multiple filters at the operation start up.

Meanwhile, in the present invention, said extracted etching solution is supplied to at least one of filters with an element of a high silicon removal rate of silicon compounds in which silicon compounds have been already deposited; however, only during a certain time period at the initial start up, solution is passed through only one filter among multiple filters, with other filters left halted; and therefore, during this period only, said extracted etching solution cannot be supplied to at least one of filters with an element of a high silicon removal rate of silicon compounds on which silicon compounds have been already deposited; however the present invention does not exclude such mode of application.

DETAILED DESCRIPTION OF THE INVENTION AND PREFERRED EMBODIMENTS

Figure 1:
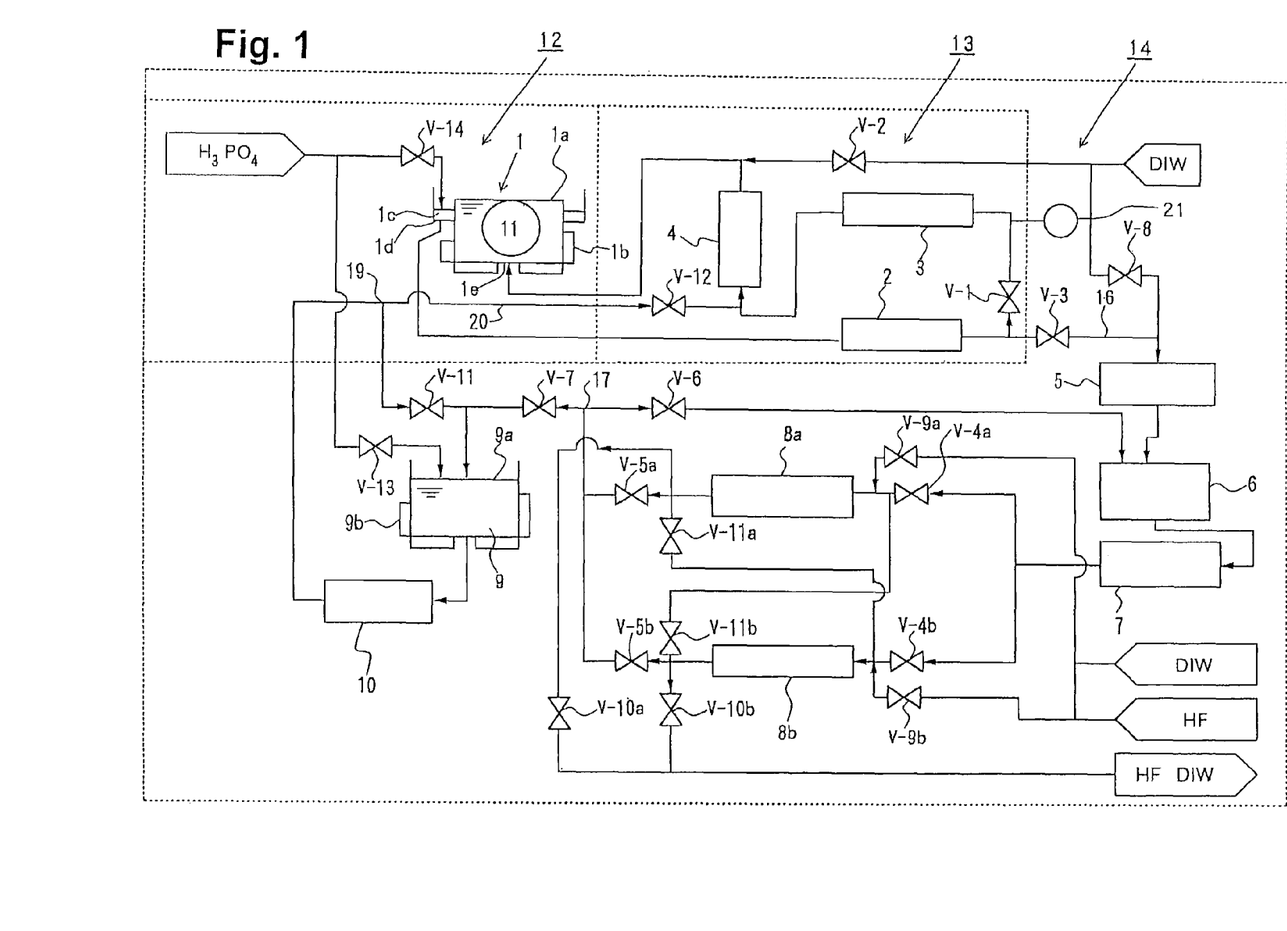
FIG. 1 An overall pattern block diagram of an etching system by the present invention FIG. 2 Diagram showing relations of wafer etching time vs. silicon concentration in phosphoric acid and use status of the filter 8a and the filter 8b, in Example 1

The following is an explanation of the present invention in reference to the drawing illustrating an embodiment of the preset invention. FIG. 1 is an overall pattern block diagram of an etching system by the present invention, composed of the etching section 12, the circulation filtration section 13 and the phosphoric acid aqueous solution regeneration section 14. The main constituent of the etching section 12 is the treatment tank 1 which aims at selectively etching silicon nitride film among silicon nitride film, silicon oxide film, silicon, etc. existing on the surface of the wafer 11, by soaking multiple numbers of the wafer 11 in the phosphoric acid aqueous solution (etching solution) heated to 150-180 degree Celsius. In the circulation filtration section 13, the phosphoric acid aqueous solution overflowing the treatment tank 1 is filtered, heated the purified water addition process and returned to the treatment tank 1, via the purified water addition process. The phosphoric acid aqueous solution regeneration section 14 branches phosphoric acid aqueous solution from the circulation filtration section 13, lowers the concentration of silicon present in a form of silicon compounds in said phosphoric acid aqueous solution, regenerates into phosphoric acid aqueous solution at a silicon concentration usable as said etching solution, and returns to the bottom of the treatment tank 1 through the heater 4.

(Etching Section 12)

The etching section 12 is provided with an automatic transfer robot, etc. (not illustrated) together with the treatment tank 1, by which wafer 11 is inserted into, and taken out of, the treatment tank 1 for etching treatment. The treatment tank 1 is an overflow tank comprising the internal tank 1a and the overflow part 1c, in which phosphoric acid aqueous solution overflowing from the top of the internal tank 1a is received by the overflow part 1c formed on the external periphery. The internal tank 1a is provided internally with the surface heater 1b, which is a heating element. The structure of introducing and draining solution comprises the automatic valve V-14, located above the overflow part 1c, which opens and closes when phosphoric acid aqueous solution is supplemented, the drain port 1d, located at the bottom wall of the overflow part 1c, to drain overflowing phosphoric acid aqueous solution into the circulation filtration section 13, and the feed port 1e, located on the bottom of the internal tank 1a, to feed phosphoric acid aqueous solution treated in the circulation filtration section 13 into the body of the treatment tank 1. The control system comprises the multiple numbers of solution level sensors (not illustrated) to sense the solution level of phosphoric acid aqueous solution at the overflow part 1c, the temperature sensor to detect temperature of phosphoric acid aqueous solution of the internal tank 1a, and the heater controller to maintain phosphoric acid aqueous solution at a certain specified temperature by controlling the surface heater 1b based on the temperature detected by said temperature sensor.

(Circulation Filtration Section 13)

The circulation filtration section 13 is equipped with the pump 2, which returns phosphoric acid aqueous solution drained from the drain port 1d equipped at the overflow part 1c to the body of the treatment tank 1 through the feed port 1e equipped at the bottom surface of the internal tank 1a, the filter 3, which filters said phosphoric acid aqueous solution, the heater 4, which heats the filtered phosphoric acid aqueous solution to a certain specified temperature, a temperature sensor and a heater controller equipped in the internal tank 1a, which controls the heater 4 and the automatic valve V-2, which adds a specified amount of purified water to the phosphoric acid aqueous solution heated up to a specified temperature. Namely, in this section, etching solution i.e., phosphoric acid aqueous solution, drained out of the overflow part 1c is, first, filtered by the filter 3. Then, the phosphoric acid aqueous solution is heated to a specified temperature by the heater 4, to which purified water is properly added by means of the automatic valve V-2 so that the concentration of phosphoric acid aqueous solution is maintained at a constant and returned to the body of the treatment tank. Here, the heater 4 heats up phosphoric acid aqueous solution drained from the overflow part 1c at a little lowered temperature, the automatic valve V-2 corrects varied concentrations of phosphoric acid aqueous solution and the filter 3 removes impurities (including deposited silicon oxide) in phosphoric acid aqueous solution. Accordingly, it is important that the filtration of the filter 3 is carried out before the phosphoric acid aqueous solution drained from the overflow part 1c is heated.

(Phosphoric Acid Aqueous Solution Regeneration Section 14)

In the phosphoric acid aqueous solution regeneration section 14, a proper amount of phosphoric acid aqueous solution flowing in the circulation filtration section 13 via the branch piping 16 and flow control means (the needle valve V-1 and autovalve V-3) equipped in the piping between the pump 2 and the filter 3 in the circulation filtration section 13 is diluted with purified water under flow control by the flow control means (autovalve V-8), cooled down to 100 degree Celsius or below by the heat exchanger 5, and recovered by the crystallization tank 6. The phosphoric acid aqueous solution recovered by the crystallization tank 6 is transferred to the filter 8a or 8b by the pump 7. The transferred phosphoric acid aqueous solution is diluted and as a result of further cooling, the saturation concentration lowers, which allows silicon compounds to crystallize, and then, the crystallized material is removed from the phosphoric acid aqueous solution by the filters 8a, 8b. Once a specified amount of silicon compounds accumulates as crystallized substance in large amounts, filtration resistance increases and flowing becomes not possible. The filter 8a, 8b are connected so that service is switched alternately to parallel mode or series mode by the autovalves V-4a, V-4b, V-5a, V-5b, V-11a, and V-11b.

The filters 8a and 8b are connected in series before the start of the operation. At first, the filter 8a only is put in service and the filter 8b is kept paused till the filtration resistance of the filter 8a is built up to a certain degree. Silicon compounds in the phosphoric acid aqueous solution transferred to the filter 8a starts to deposit as a crystallized substance and grow once it excels saturation in concentration, and if deposition of silicon compounds goes on in the filter 8a, silicon compounds further tend to crystallize around formerly crystallized substance as a core, and thus the silicon removal rate for silicon compounds increases. At the time when silicon compounds have accumulated in the filter 8a and the silicon removal rate becomes high, the operation of the filters 8a and 8b is switched to run in series by the autovalves V-4a, V-4b, V-5a, V-5b, V-11a, and V-11b. When the filters 8a and 8b are switched to the series operation, the filter 8b, which has not been operated and therefore has no deposit of silicon compounds, is located upstream of the flow, so that silicon compounds are deposited in the filter 8b to a degree that the silicon removal rate becomes high, and the filter 8a, in which silicon compounds have deposited and the silicon removal rate has become high, is located downstream of the flow. Then, once silicon has deposited in the filter 8b and its silicon removal rate has become high, the operation of the filters 8a and 8b is switched to the parallel run by the autovalves V-4a, V-4b, V-5a, V-5b, V-11a, and V-11b, and the filter 8a is switched to washing operation being supplied with cleaning fluid. On the other hand, only to the filter 8b, which has deposited silicon compounds and becomes high in silicon removal rate, said extracted etching solution is supplied and said silicon compounds are removed only by the filter 8b.

The following is a detailed explanation about an example as to how the phosphoric acid aqueous solution regeneration system 14 works. Before the operation start, the autovalves V-4a and V-5a are opened and phosphoric acid aqueous solution is passed through the filter 8a for filtering, with other valves V-4b, V-5b, V-11a and V-11b kept closed. Once silicon compounds accumulate in the filter 8a, the filtration resistance of it increases. Whereas, the pump 7 is equipped with an operation speed sensor by which the amount of accumulated silicon compounds is estimated or the amount is calculated from the filtration time or wafer etching time. When accumulated silicon amount in the filter 8a has excelled a predetermined volume, autovalves V-4b and V-11b are opened and V-4a is closed to begin operation of the filters 8a and 8b in series run. In this way, after phosphoric acid aqueous solution is passed through the filter 8b, filtration is carried out by the filter 8a. Even if the silicon removal rate of the filter 8b is low, filtration is performed by the filter 8a with already deposited silicon compounds and therefore having a high silicon removal rate; thus keeping operation at a high silicon removal rate, the filter 8b can accumulate silicon compounds simultaneously.

Continued operation of the filter 8a with a high accumulation volume of silicon compounds will reach the state in which the filtration resistance is too high to allow fluid to pass through, that is, the stage where cleaning is needed to remove silicon compounds from the filter 8a. Because of the series connection run, silicon compounds have already accumulated in the filter 8b, and the silicon removal rate of the filter 8b has now been high and therefore, the filter 8a is removed from the filtration line by closing autovalves V-5a and V-11b and opening V-5b and the phosphoric acid aqueous solution is passed to the filter 8b only. Whereas, autovalves V-9a and V-10a are opened for cleaning of the filter 8a with HF. By these operations, high silicon removal rate can be maintained without interrupting removal of silicon compounds, and also before silicon accumulation in the filter 8b has become excessive, the filter 8a can remove silicon compounds for resumption of the line connection. Though the detailed explanation of the cleaning operation for the filter 8a is omitted, briefly speaking, silicon compounds in the filter 8a are dissolved with HF, followed by flushing of the HF components with deionized water (purified water). After cleaning, the filter 8a is again connected with the filter 8b in series for successive filtration, by opening the autovalves V-4a and V-11a, and closing V-4b, before the filter 8b reaches the stage that cannot pass fluid due to excessive accumulation of silicon. After silicon compounds accumulate in the filter 8a and its silicon removal rate becomes high, the autovalve V-5 is opened and V-11a and V-5b are closed, and thus, by removing the filter 8b, phosphoric acid aqueous solution is allowed to pass through the filter 8a only; while the autovalves V-9b and V-10b are opened for cleaning the filter 8b by means of HF. These operations are repeated. Phosphoric acid aqueous solution overflowing the filter 8a or 8b is transferred to the concentration tank 9 if the liquid level of the tank is below the full by opening the autovalve V-7 and closing V-6. In contrast, if the liquid level of the concentration tank 9 shows its full, phosphoric acid aqueous solution is returned to the crystallization tank 6 by closing the autovalve V-7 and opening V-6 for circulation filtration. Phosphoric acid aqueous solution transferred to the concentration tank 9 is heated by the heater 9b up around the temperature of the phosphoric acid aqueous solution in the treatment tank, 160 degree Celsius, and the purified water added at the autovalve V-8 is evaporated, the valve V-12 is opened and phosphoric acid aqueous solution with silicon compounds removed are sent to the circulation filtration section 13. In order to maintain the circulating phosphoric acid aqueous solution at a high temperature, a portion of it is returned to the concentration tank 9 via the flow control valve 11 from the branding point 19. Also, temperature drop is minimized by designing the branch piping 20 as short as possible.

EXAMPLE

Example 1

The following is an example of the present invention.

A silicon oxide film is formed on the surface of the semiconductor wafers as an element separation film. In the formation process, silicon oxide film and silicon nitride film exist on the wafer surface, and for selective etching of the silicon nitride film, phosphoric acid aqueous solution with a concentration at 85-90 mass % is applied as etching solution. During etching the silicon nitride film with said phosphoric acid aqueous solution, silicon component in the silicon nitride film leaks out into phosphoric acid aqueous solution, forming silicon compounds, which accumulate gradually in the phosphoric acid aqueous solution. Namely, this etching process with phosphoric acid attempts at etching silicon nitride film only, leaving silicon oxide film un-etched. However, silicon oxide film is also etched, though slightly. If silicon leaks out into phosphoric acid, the silicon acts as inhibitor to the etching of oxide film; for instance, if silicon contains at 60 ppm or more, oxide film will not be etched. In the production process, the phosphoric acid treatment is desirably carried out under the silicon concentration in phosphoric acid at 60 ppm or more measured at the densitometer 21, so that the oxide film is prevented from being etched. Namely, if etching is implemented at 60 ppm or more of silicon, oxide film is hardly etched and only nitride film is able to be etched. For this reason, the silicon concentration in the phosphoric acid is controlled to 60 ppm or more measured at the densitometer 21; more specifically, if the silicon concentration in phosphoric acid is monitored at the densitometer 21 at 60 ppm or less, phosphoric acid supply to the phosphoric acid aqueous solution regeneration section 14 is stopped and if it exceeds 60 ppm at the densitometer 21, phosphoric acid regeneration is implemented. By this operation, since only the increased amount through etching of nitride film is accumulated in the filters, the amount of silicon accumulated in the filters can be calculated by measuring the etching time of nitride film after the time when silicon has reached 60 ppm or more at the densitometer 21. Meanwhile, the densitometer 21 is located near the filter 3 in FIG. 1; however, the position is not limited to the case in the example but may be downstream of the treatment tank 1 or the heat exchanger 5, or elsewhere.

TABLE 1

| Accumulative Etching Time | | | | |
|---|---|---|---|---|
| Start time | Finish time | Balance | Item | Service |
| 5 | 500 | 500 | Si dissolved up to 60 ppm in phosphoric acid | Regeneration treatment stop |
| 500 | 1260 | 760 | Filter 8a Si accumulating | Filter 8a only in service |
| 1260 | 2730 | 1470 | Filter 8b Si accumulating | Filter 8b -> 8a |
| 2730 | 3030 | 300 | Filter 8a washing | Filter 8b only in service |
| 3030 | 4500 | 1470 | Filter 8a Si accumulating | Filter 8a -> 8b |
| 4500 | 4800 | 300 | Filter 8b washing | Filter 8a only in service |
| 4800 | | | Filter 8b Si accumulating | Filter 8b -> 8a |

Figure 2:
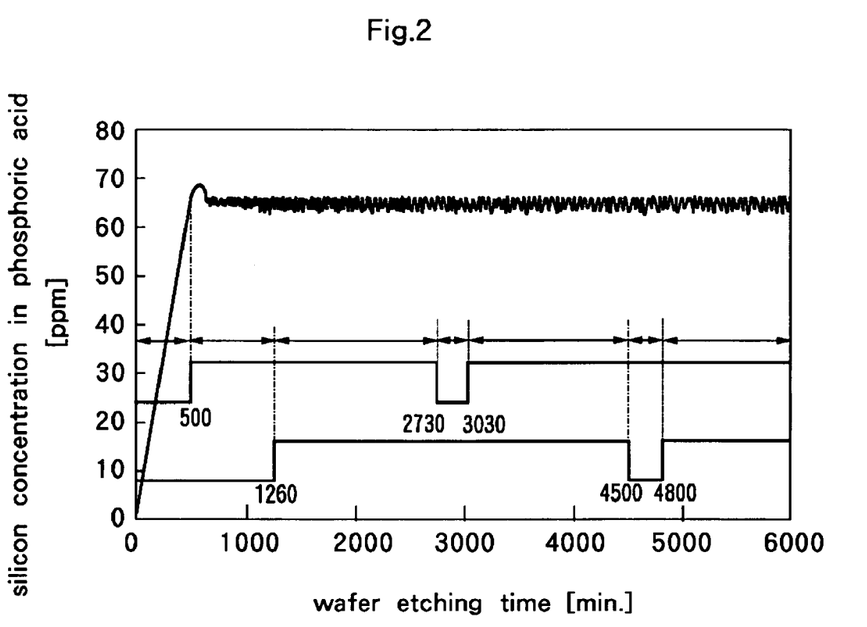
Figure 3:
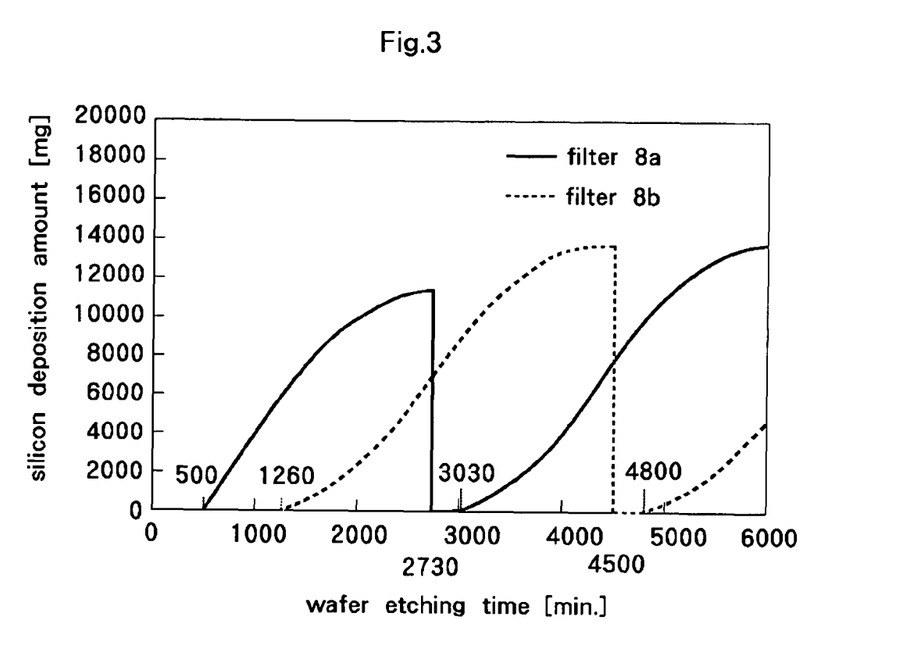
FIG. 3 Diagram showing wafer etching time vs. silicon deposit amount of the filter 8a and the filter 8b, in Example 1

In Example 1, phosphoric acid aqueous solution is boiled to keep at 160 degree Celsius by actuating the pump 2, controlling the heater 4 and the heater 1b of the treatment tank and adding purified water by the automatic valve V-2. Under these conditions, etching was performed in the treatment tank 1 to the 1500 angstrom, 6-inch nitride film-deposited wafer 11 coated with silicon nitride film, applying 35 liter (60 kg) of phosphoric acid aqueous solution for a cumulative etching time of 500 minutes (about 8 hours). After that, the regeneration treatment was controlled so that the silicon concentration in the phosphoric acid is 60 ppm or more measured at the densitometer 21 and the filter 8a began to be used. From the start of the use to 1260 minutes, that is, up until 21 hours, the silicon removal rate of the filter 8a gradually elevated. During that period, about 6 g of silicon accumulated in the filter. Then, the filter 8b was installed upstream of the filter 8a. At 1470 minutes later, which corresponds to a cumulative etching time of 2730 minutes, that is, about 50 hours, about 6 g of silicon deposited in the filter 8b, showing an elevated silicon removal rate. Then, the filter 8a was separated for cleaning and only the filter 8b was put in service. In the filter 8a, about 12 g of silicon deposited. The cleaning time of the filter 8a was 6 hours, and since the wafer did not always undergo etching, the filter cleaning completed after 3030 minutes (about 50 hours) as an cumulative etching time, considering the time during which etching was not performed. Then, the filter 8a was installed upstream of the filter 8b, where silicon accumulated in the filter 8a. After 1470 minutes, which corresponded to a cumulative etching time of 4500 minutes, about 6 g of silicon accumulated in the filter 8a, showing an elevated silicon removal rate. Then, the filter 8b was separated for cleaning and only the filter 8a was put in service. In the filter 8b, about 12 g of silicon deposited. FIG. 2 shows the relations between the wafer etching time and the concentration of silicon in phosphoric acid together with the usage of the filters 8a and 8b, and FIG. 3 shows the relationship between the wafer etching time vs. silicon accumulation amount in the filters 8a and 8b. By repeating these operations, said extracted etching solution was able to be supplied to at least one of filters with an element of a high silicon removal rate of silicon compounds with already deposited silicon compounds, except the case of the first parallel connection of said multiple numbers of filters at the operation start, thus the silicon removal rate in the phosphoric acid regeneration section being able to be maintained constantly at high.

Example 2

Figure 4:
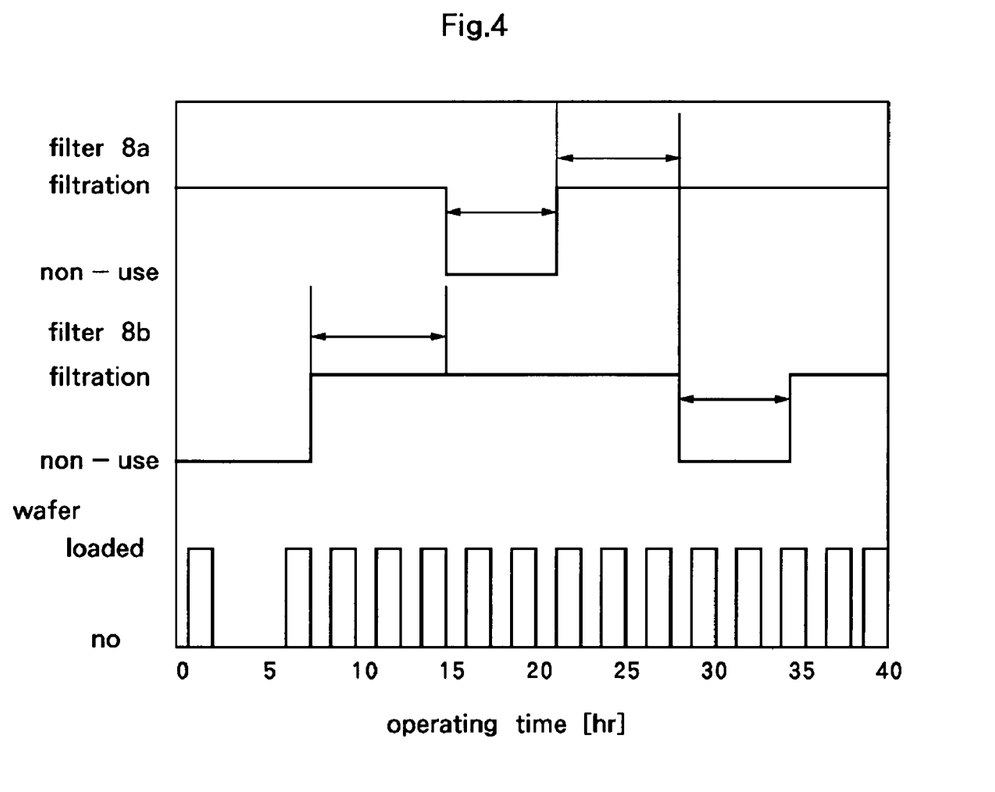
FIG. 4 Diagram showing relation of operating time vs. silicon concentration in phosphoric acid and use status of the filter 8a and the filter 8b, in Example 2
Figure 5:
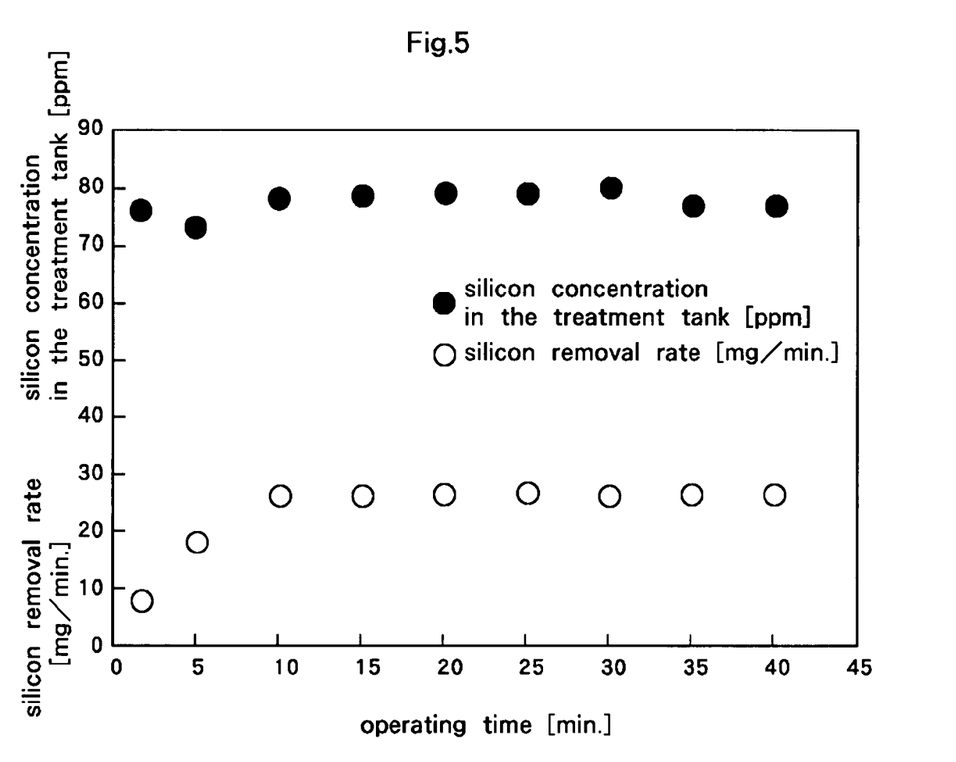
FIG. 5 Diagram showing operating time vs. silicon concentration in the treatment tank and silicon removal rate, in Example 2

In Example 2, only the switching time of the filters 8a and 8b was changed as shown in FIG. 4, and all other conditions have remained the same as Example 1, the results of which are given in Table 2 and FIG. 5. As a result, except the case of the first parallel connection of said multiple filters at the operation start, said extracted etching solution was able to be supplied to at least one of filters with an element of a high silicon removal rate of silicon compounds with already deposited silicon compounds, and thus the silicon removal rate in the phosphoric acid regeneration section was able to be maintained constantly at high, as with the case of Example 1.

TABLE 2

| Time Hr. | Wafer — | Si Conc. In TK ppm | Si Removal rate mg/min | Filter Service Route — |
|---|---|---|---|---|
| 1.7 | loaded | 76 | 8 | 8a only |
| 5 | no | 73.33446 | 18 | 8a only |
| 10 | no | 78.13727 | 26 | 8b -> 8a |
| 15 | loaded | 78.36184 | 26 | 8b -> 8a |
| 20 | loaded | 78.5864 | 26 | 8b only |
| 25 | loaded | 78.81096 | 26 | 8a -> 8b |
| 30 | loaded | 79.90886 | 26 | 8a only |
| 35 | loaded | 76.62512 | 26 | 8b -> 8a |
| 40 | loaded | 76.84969 | 26 | 8b -> 8a |

Example 3

Figure 6:
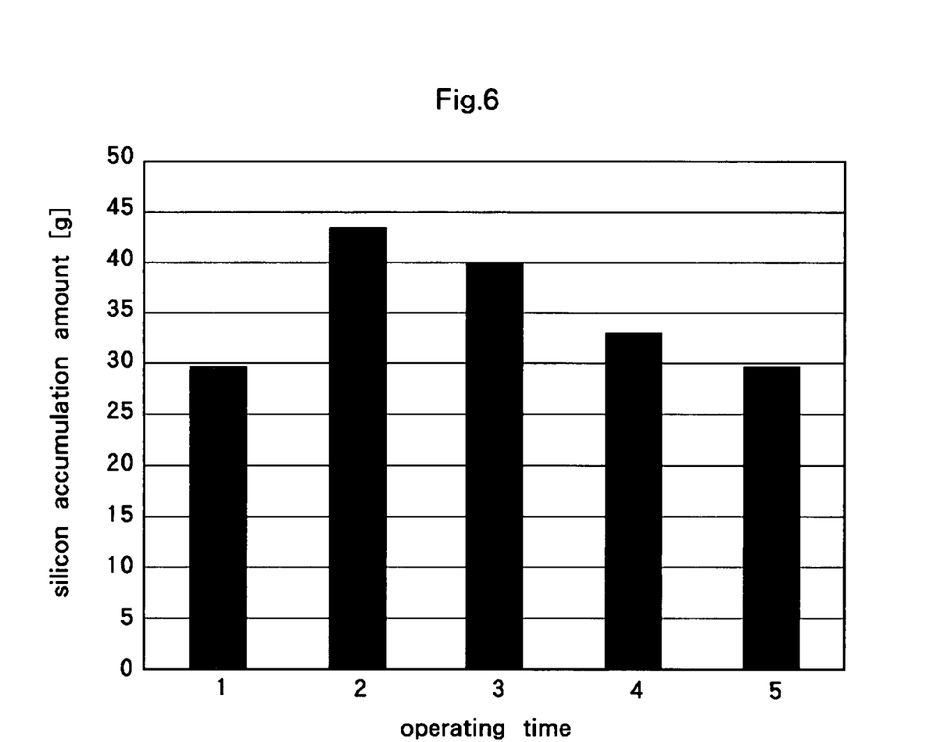
FIG. 6 Diagram showing the maximum silicon accumulation amount till clogging of the filter FIG. 7 Diagram showing silicon accumulation amount and silicon removal rate
Figure 7:
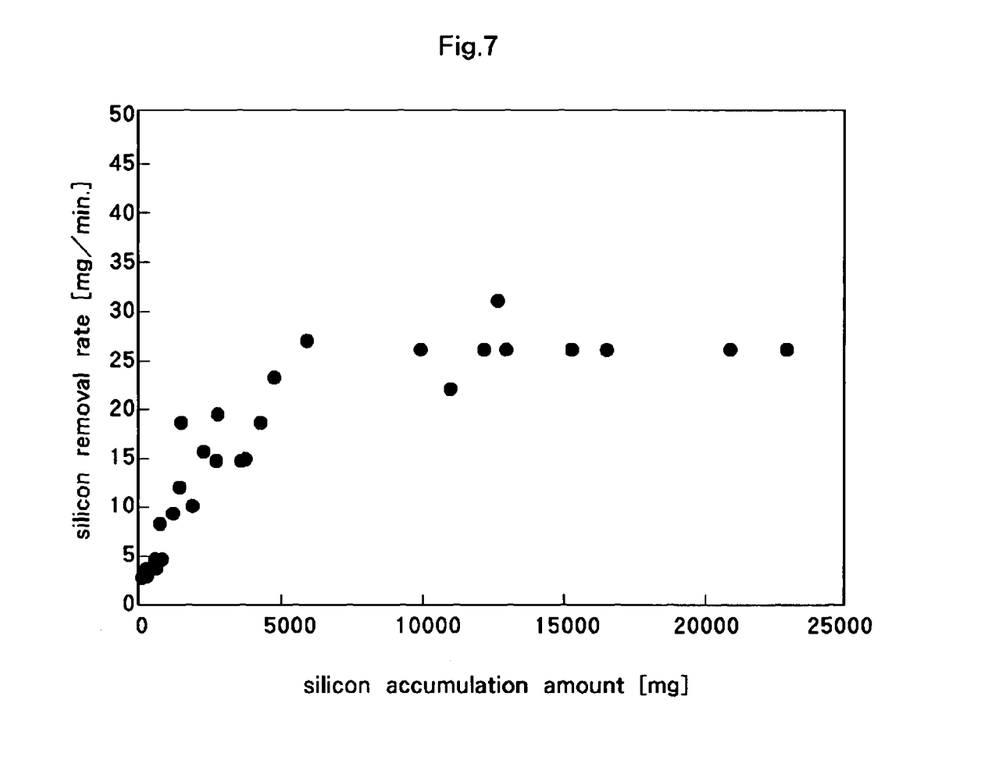

The time duration when the filters 8a and 8b are connected in series is preferably determined so that the switching should be made at a shorter cycle than a half of the silicon accumulation amount which leads to the filter clogging, since, from FIG. 2 and FIG. 4, each filter is used, at maximum, at two times for silicon accumulation and one time for cleaning. Whereas, if the time is too short, the silicon accumulation amount to the filters becomes insufficient, and silicon compounds do not accumulate in the filters till the silicon removal rate reaches high enough, and therefore the use beyond a certain degree becomes necessary. The maximum silicon accumulation amount till the filter clogging is found to be 29 grams to 43 grams as shown in FIG. 6. Therefore, switching from the series connection to the parallel connection of the filter 8a and the filter 8b should be desirably made at the point that the silicon accumulation amount in the filter reaches 14.5 grams to 21.5 grams. FIG. 7 shows the relation between the silicon accumulation amounts vs. the silicon removal rates. If the silicon accumulation amount exceeds 5 grams, the silicon removal rate becomes 25 mg/min., which is almost the maximum. The FIG. 5 grams corresponds to 0.17 to 0.11 of the 29 grams to 43 grams, which are the maximum silicon accumulation amounts till the filter clogging. Therefore, the time for series connection of the filter 8a and the filter 8b should, preferably, be the time corresponding to one tenth to one half of the maximum amount of accumulation up till clogging of the filter with silicon compounds occurs.

The present invention is not limited by said examples, but is changeable in different ways and cab be developed. In said examples, two filters, the filter 8a, 8b are connected alternately in parallel or in series; however as other embodiments within the patent claims, it is possible to connect three or more filters in combination, to meet prolonged washing hours or large volume of accumulation, depending on applying e wafer size, number of wafers, etching hours, etching amount, etc.

The present invention relating to the etching solution for silicon nitride film, as the object, applying phosphoric acid aqueous solution can remove silicon compounds in the etching solution constantly at a high removal rate through use of filters with filter elements of a high silicon removal rate with already deposited silicon compounds beyond a certain amount level, having been always used over a certain period of time, can eliminate silicon compounds produced in etching solution extremely efficiently, being more suitable for an industrial process, and can reduce the cost for regenerating treatment of etching solution.

This application claims the priorities of Japanese Patent Application 2006-279098 filed on Oct. 12, 2006, the teachings of which are incorporated herein by reference in their entirety.

The invention claimed is:
1. A method for regenerating etching solution, wherein the etching solution is a phosphoric acid aqueous solution used to etch a silicon nitride film within a treatment tank, comprising the steps of:
    extraction of the etching solution containing silicon compounds produced from said etching out of the treatment tank; and
    removal of said silicon compounds from said extracted etching solution by filtration, wherein
        said removal by filtration comprises supplying said extracted etching solution through a piping path comprising multiple filters connected to the piping path with valves, and switching flow of said extracted etching solution through said multiple filters alternately:
        (a) in series with switching so that each one of said multiple filters, in turn, is connected upstream of other of said multiple filters; and (b) through a selected one or more of said multiple filters,
    and wherein, after start up operation, said extracted etching solution is supplied at least to a first filter of said multiple filters comprising a filter element having already-deposited silicon compounds.
2. A regenerating method according to claim 1, further comprising the steps of:
    switching the flow of said extracted etching solution so that said multiple filters are connected to the piping path in series so that said flow is first supplied to a second filter of said multiple filters comprising a filter element having no deposit of silicon compounds, said second filter being upstream of said first filter on said piping path;

continuing to supply the flow of said extracted etching solution through the second filter and the first filter in series until silicon compounds deposit and accumulate on the filter element of said second filter; and then switching the flow of said extracted etching solution to supply the flow only to said second filter and at the same time removing said first filter for rinsing to remove deposited silicon compounds.

3. A regenerating method according to claim 2, wherein a time during which said multiple filters are connected to the piping path in series is a time corresponding to one tenth to one half of the maximum amount of accumulation until clogging of the filter with silicon compounds occurs.

4. A method for etching, comprising:

an etching process of etching a silicon nitride film using an etching solution comprising phosphoric acid aqueous solution in a treatment tank;

a circulation filtration process in which etching solution containing silicon compounds produced in said etching process is extracted out of the treatment tank, filtrated and circulated to the treatment tank;

a phosphoric acid aqueous solution regeneration process in which a portion of the etching solution is extracted out of said circulation filtration process, water is added to said portion of extracted etching solution, and silicon compounds crystallized in said extracted etching solution are filtered for removal, causing said etching solution to be regenerated, wherein said filtering for removal comprises supplying said extracted etching solution through a piping path comprising multiple filters connected to the piping path with valves, and switching flow of said extracted etching solution through said multiple filters alternately: (a) in series with switching so that each one of said multiple filters, in turn, is connected upstream of other of said multiple filters; and (b) through a selected one or more of said multiple filters, and wherein, after start up operation, said extracted etching solution is supplied at least to a first filter of said multiple filters comprising a filter element having already-deposited silicon compounds, to yield regenerated etching solution, and a process of returning said regenerated etching solution to said treatment tank of said etching process.

* * * * *